(12) United States Patent
Dubois (10) Patent No.: US 11,235,473 B2
(45) Date of Patent: Feb. 1, 2022

(54) AUTOMATED DEVICE FOR GRIPPING AND HANDLING A TREAD FOR A TIRE

(71) Applicant: COMPAGNIE GENERALE DES ETABLISSEMENTS MICHELIN, Clermont-Ferrand (FR)

(72) Inventor: Clément Dubois, Clermont-Ferrand (FR)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 156 days.

(21) Appl. No.: 16/610,613

(22) PCT Filed: May 4, 2018

(86) PCT No.: PCT/EP2018/061570
§ 371 (c)(1),
(2) Date: Nov. 4, 2019

(87) PCT Pub. No.: WO2018/202879
PCT Pub. Date: Nov. 8, 2018

(65) Prior Publication Data
US 2020/0061846 A1    Feb. 27, 2020

(30) Foreign Application Priority Data

May 5, 2017   (FR) ...................................... 1754013

(51) Int. Cl.
*B29D 30/58*        (2006.01)
*B65H 5/14*         (2006.01)
(Continued)

(52) U.S. Cl.
CPC ...... *B25J 15/0071* (2013.01); *B29D 30/3007* (2013.01); *B65H 5/14* (2013.01);
(Continued)

(58) Field of Classification Search
CPC ............ B29D 30/58; B29D 2030/4462; B29D 2030/4468; B29D 2030/4487;
(Continued)

(56) References Cited

U.S. PATENT DOCUMENTS 2,556,305 A  *  6/1951  Vickers ............. B29C 66/81461
                                                          156/122
4,052,246 A  *  10/1977 Albareda .......... B29C 66/81461
                                                          156/412
(Continued)

FOREIGN PATENT DOCUMENTS

FR           2508016 A1    12/1982
WO        2006015896 A1     2/2006
(Continued)

OTHER PUBLICATIONS

International Search Report and Written Opinion for International Application No. PCT/2018/061570 dated Jul. 13, 2018 with Translation.

*Primary Examiner* — Geoffrey L Knable
(74) *Attorney, Agent, or Firm* — Dickinson Wright PLLC; Steven Hurles (57) ABSTRACT

The device comprises at least one module for stitching the tread and a means for moving the module vertically and horizontally. The stitching module comprises a frame which is provided with a fixed stitching assembly, equipped with spikes, and at least one mobile stitching assembly. The at least one mobile stitching assembly comprises at least one stitching plate provided at the base of same with at least one planar horizontal contact surface, from which at least two spikes protrude. The plate is arranged in a vertical guide space provided in the frame such that the spikes protrude downwards and such that it is free to move vertically in this space over a limited travel path. The device also includes a vertical movement device for moving the plate from the top (Continued)

downwards in this guide space and a device for locking the altitude position of the plate in this space.

12 Claims, 8 Drawing Sheets

(51) Int. Cl.
  *B25J 15/00* (2006.01)
  *B29D 30/30* (2006.01)
  *B29D 30/44* (2006.01)
  *B29L 30/00* (2006.01)
  *B65H 5/10* (2006.01)
  *B29D 30/00* (2006.01)

(52) U.S. Cl.
  CPC ...... *B29D 30/58* (2013.01); *B29D 2030/0038* (2013.01); *B29D 2030/3064* (2013.01); *B29D 2030/4487* (2013.01); *B29L 2030/002* (2013.01); *B65H 5/10* (2013.01); *B65H 2801/93* (2013.01)

(58) Field of Classification Search
  CPC .... B29D 2030/0038; B65H 3/22; B65H 5/10; B65H 5/14; B65H 5/16; B25J 15/0071
  See application file for complete search history.

(56) References Cited

U.S. PATENT DOCUMENTS

| | | | | |
|---|---|---|---|---|
| 4,372,548 A | * | 2/1983 | Aurich | B65H 3/22 |
| | | | | 271/18.3 |
| 4,641,827 A | * | 2/1987 | Walton | B65H 3/22 |
| | | | | 198/692 |
| 5,463,921 A | * | 11/1995 | Bellio | B26D 7/1836 |
| | | | | 83/151 |
| 5,669,602 A | | 9/1997 | Ito | |
| 5,935,377 A | | 8/1999 | Sergel et al. | |
| 9,130,485 B2 | * | 9/2015 | Prahlad | H02N 13/00 |
| 2003/0070742 A1 | | 4/2003 | Risser et al. | |

FOREIGN PATENT DOCUMENTS

| | | |
|---|---|---|
| WO | 2007138374 A1 | 6/2007 |
| WO | 2014090983 A1 | 6/2014 |

* cited by examiner

AUTOMATED DEVICE FOR GRIPPING AND HANDLING A TREAD FOR A TIRE

This application is a 371 national phase entry of PCT/EP2018/061570, filed on May 4, 2018, which claims benefit of French Patent Application No. 1754013, filed May 5, 2017, the entire contents of which are incorporated herein by reference for all purposes.

BACKGROUND

1. Technical Field

The disclosure relates to the field of manufacturing tires for vehicles.

The present disclosure relates more specifically to an automated device for gripping and handling a tread for a tire.

The disclosure also relates to an installation for moving a tread for a tire, which is provided with said device.

2. Related Art

A tire for the wheel of a vehicle generally comprises a tread, which is applied to the outer surface thereof before it is vulcanized.

This tread is in the form of a strip of a green rubber compound, that is to say one which has not yet been cured. It incorporates a plurality of longitudinal furrows, that is to say grooves that extend along its entire length and to a particular depth from its outer surface and thus determine a given profile of the tread of the future tire. In other words, the "profile" of the tread corresponds to its contour in cross section.

The tread is manufactured in the form of a continuous strip that is stored on reels. Next, this continuous strip is unrolled from the storage reel, cut to the appropriate length for surrounding the circumference of the tire, and then moved and positioned on a cylindrical form (which may be either a tire blank or a cylindrical drum for temporary storage prior to laying on the blank). Finally, the two ends of the tread are butted together with precision.

In the prior art, the handling of the tread between the outlet of the cutting tool and the cylindrical form takes place manually.

However, it would be desirable to have an automated device for this purpose.

Already known, from the document WO 2007/138374, is a device for gripping and handling a tread for a tire, which comprises a module for pricking this tread and means for moving said module vertically and horizontally.

Likewise known, from the document EP 2 931 509, corresponding to WO 2014/090983, is a device for transporting a carcass reinforcement ply, said device being used in a method for manufacturing a tire blank. That device comprises a suction-cup gripping module.

None of the devices described in those documents makes it possible to optimize the gripping of the tread or reinforcement in terms of modularity and safety, however.

SUMMARY

Therefore, an objective of the disclosure is to propose an automated gripping and handling device that makes it possible to automatically transport a tread from the outlet of the cutting tool to the cylindrical form while keeping it under tension, that is to say slightly stretched in order to prevent its retraction.

Another objective of the disclosure is for the device not to damage the tread while it is being moved and for it to be able to function with treads having different profiles.

To this end, the disclosure relates to an automated device for gripping and handling a tread for a tire.

According to the disclosure, this device comprises at least one module for pricking said tread,
    means for moving said pricking module vertically,
    means for moving said pricking module horizontally in a linear direction of horizontal movement,
and said pricking module comprises a frame provided with at least one movable pricking assembly and at least one fixed pricking assembly,
    said fixed pricking assembly comprising a flat, horizontal abutment surface formed at the base of said frame, at least two spikes projecting downward from said surface, said movable pricking assembly comprising:
        at least one pricking plate provided at its base with at least one flat horizontal contact surface from which at least two spikes project, this pricking plate being disposed inside a vertical guiding space formed in said frame, such that the spikes thereof project downward, and this plate being freely movable vertically in this space over a limited travel,
        a device for moving said plate vertically from top to bottom inside said vertical guiding space, and
        a device for locking the height position of said plate inside said vertical guiding space.

By virtue of these features of the disclosure, it is possible to prick the tread effectively, to keep it under tension without damaging it, and to transport it, the movable pricking plates making it possible to adapt the device to treads having different profiles.

According to other advantageous and non-limiting features of the disclosure, considered alone or in combination:
    said pricking module comprises, on one and the same frame, a fixed pricking assembly at the center and two movable pricking assemblies disposed on either side;
    each pricking plate comprises two spikes known as the "front" spike and the "rear" spike, which are separated from one another by said contact surface, the tips of these two spikes being spaced apart by a spacing known as "third spacing";
    the movable pricking assembly comprises at least two movable pricking plates, which are disposed in parallel and in such a way that the axis connecting the tips of the front spike and rear spike of each plate is parallel to said direction of horizontal movement of said pricking module and in such a way that the tips of the front spikes of the different plates are aligned along an axis perpendicular to said direction of movement of the module and that the tip of the front spike of a plate is spaced apart from the tip of the front spike of the neighbouring plate by a spacing known as "fourth spacing";
    said movable pricking plate comprises at least one stop for limiting its travel in its two directions of vertical movement;
    said device for moving said plate vertically from top to bottom comprises:
    an inflatable sleeve,
    a bore for receiving said inflatable sleeve, formed in an upper part of said frame, this bore having, at its bottom, a horizontal slot that extends perpendicularly to said direction of horizontal movement of the pricking module, this slot leading out above said vertical guiding space, and the latter being formed in a lower part of said frame, a device for inflating said sleeve, configured to be able to be connected to a compressed air supply, said movable pricking plate being disposed inside the vertical guiding space such that its upper end rests against the inflatable sleeve when it is in its bottom position and such that its upper end deforms said inflatable sleeve when it is at a height greater than said bottom position, said inflatable sleeve tending to push said plate back downward when it is inflated;

said frame comprises, in its lower part, a housing, which has a cross shape in cross section in a plane parallel to said direction of horizontal movement of the pricking module, i.e. is provided with a horizontal leg and with a vertical leg, the latter leading onto the lower surface of the frame, said pricking plate is likewise cross-shaped, such that it comprises a plate provided with two arms, said pricking plate is disposed in said housing such that the plate can slide in the vertical leg and each of its arms can slide in one of the horizontal legs, the two arms forming stops for limiting the travel of said plate, and fittings are disposed in the horizontal leg in a manner parallel to one another and in a plane parallel to that of said direction of horizontal movement of the pricking module, each pricking plate being interposed between two of these fittings, the housing delimiting, with two adjacent fittings, said vertical guiding space of the pricking plate;

the top of said vertical leg of the cross-shaped housing leads into the slot of the receiving bore of the inflatable sleeve;

said device for locking the height position of said plate comprises a thrust cylinder that applies axial thrust in a horizontal direction perpendicular to said horizontal direction of movement of the pricking module, so as to clamp said fittings and said at least one movable plate together and to prevent the vertical movement of said pricking plate, when the thrust cylinder is activated;

it comprises three pricking modules that are disposed parallel to one another such that their respective longitudinal axes are perpendicular to the direction of horizontal movement of the pricking module.

The disclosure also relates to an installation for moving a tread for a tire.

According to the disclosure, this installation comprises:
an element for guiding in linear translation,
an automated device for gripping and handling a tread for a tire as mentioned above, the horizontal movement means of which make it possible to move said pricking module along said element for guiding in linear translation,
a belt for linearly moving said tread, said belt being disposed under said automated gripping and handling device, this belt allowing the tread to be moved in a horizontal direction parallel to said direction of horizontal movement of said pricking module.

Advantageously, the installation also comprises a laying form that is able to receive said tread at the end of said moving belt.

BRIEF DESCRIPTION OF THE FIGURES

Further features and advantages of the disclosure will become apparent from the description which will now be given thereof, with reference to the appended drawings which show, by way of non-limiting example, one possible embodiment thereof.

In these drawings.

DETAILED DESCRIPTION OF EXAMPLE EMBODIMENTS

Figure 1:
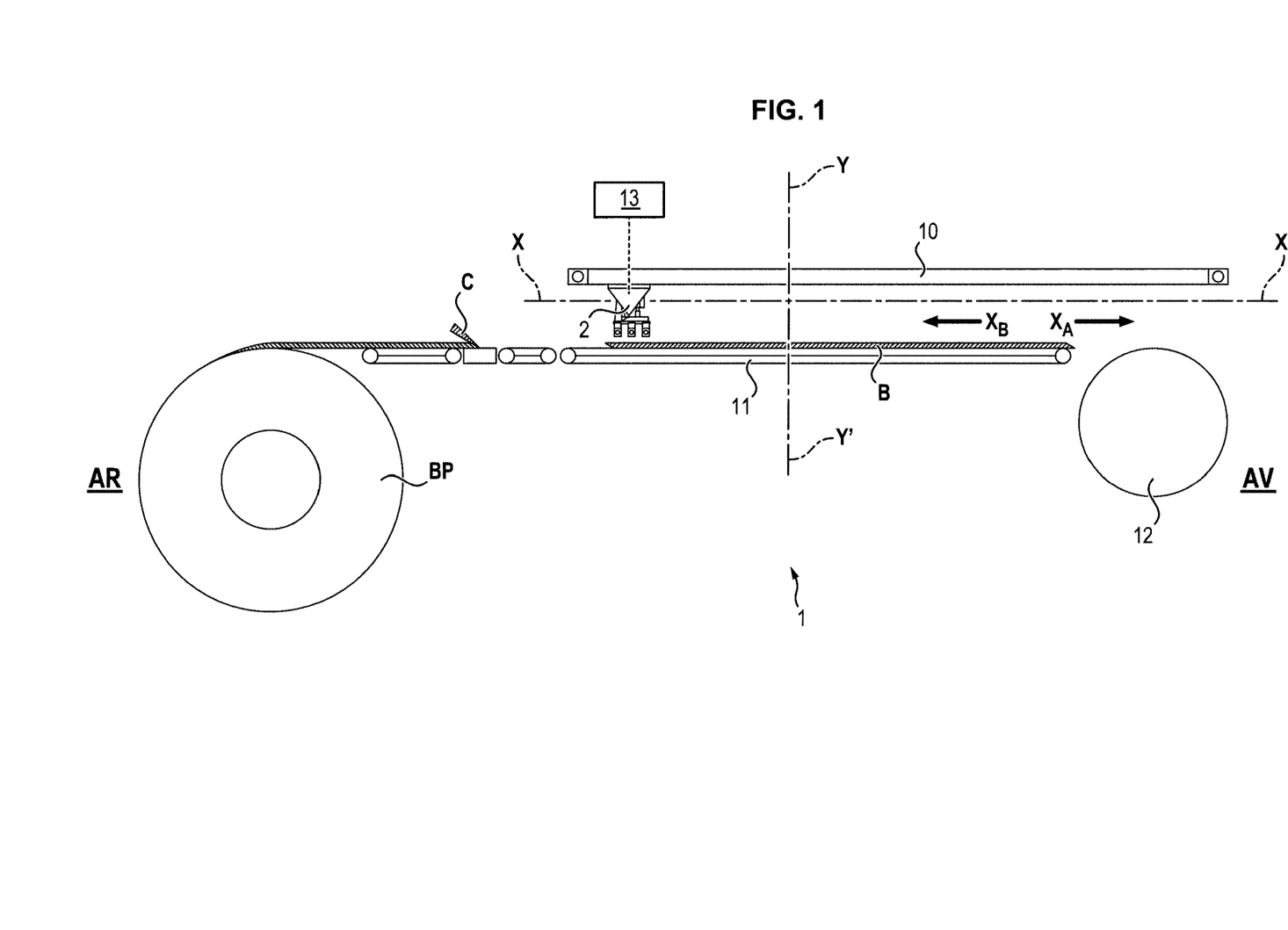
FIG. 1 is a diagram showing an embodiment of the installation for moving a tread according to the disclosure.

Referring to FIG. 1, an exemplary embodiment of an installation 1 for moving a tread B for a tire can be seen.

This installation 1 comprises:
an element 10 for guiding in linear translation, such as a guide rail,
an automated device 2 for gripping and handling a tread B for a tire, designed to move along said guide element 10 in a rectilinear direction X-X', specifically in two opposite directions Xa, Xb,
a belt 11 for moving said tread B linearly in a direction parallel to the direction X-X'.

The moving belt 11 is preferably a motorized belt, comprising an endless belt driven at its two ends by two rotary rollers.

Likewise preferably, this installation 1 comprises a cylindrical laying form 12 that is able to receive the tread B at the end of the moving belt 11.

The installation 1 is fed from a product reel BP disposed upstream of the installation 1, a cutting device C being interposed between the product reel BP and the installation 1. This cutting device C makes it possible to cut the necessary length of tread B before the latter is moved with the installation according to the disclosure.

Figure 2:
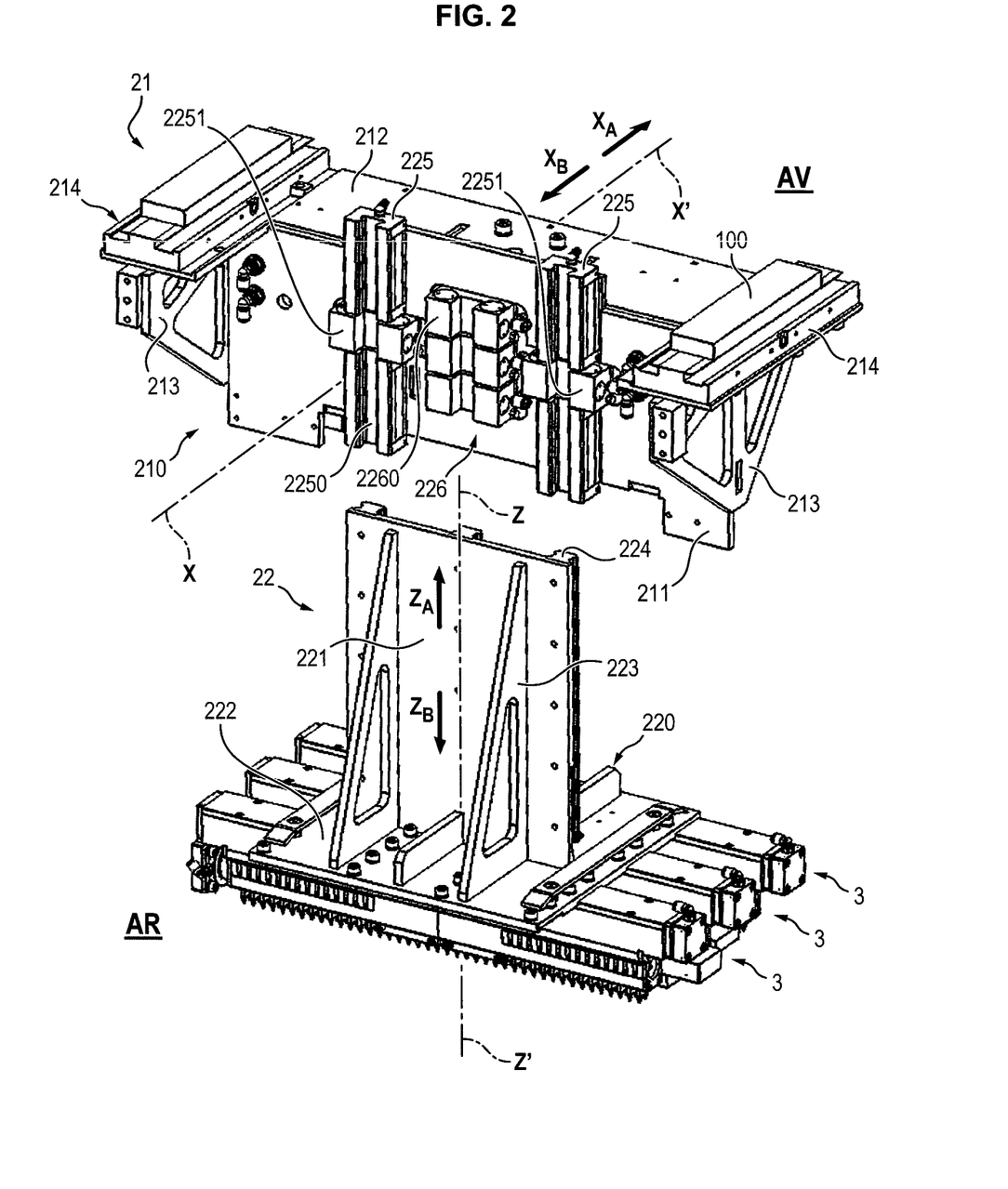
FIG. 2 is a perspective, exploded view of the automated device for gripping and handling a tread for a tire according to the disclosure.
Figure 3:
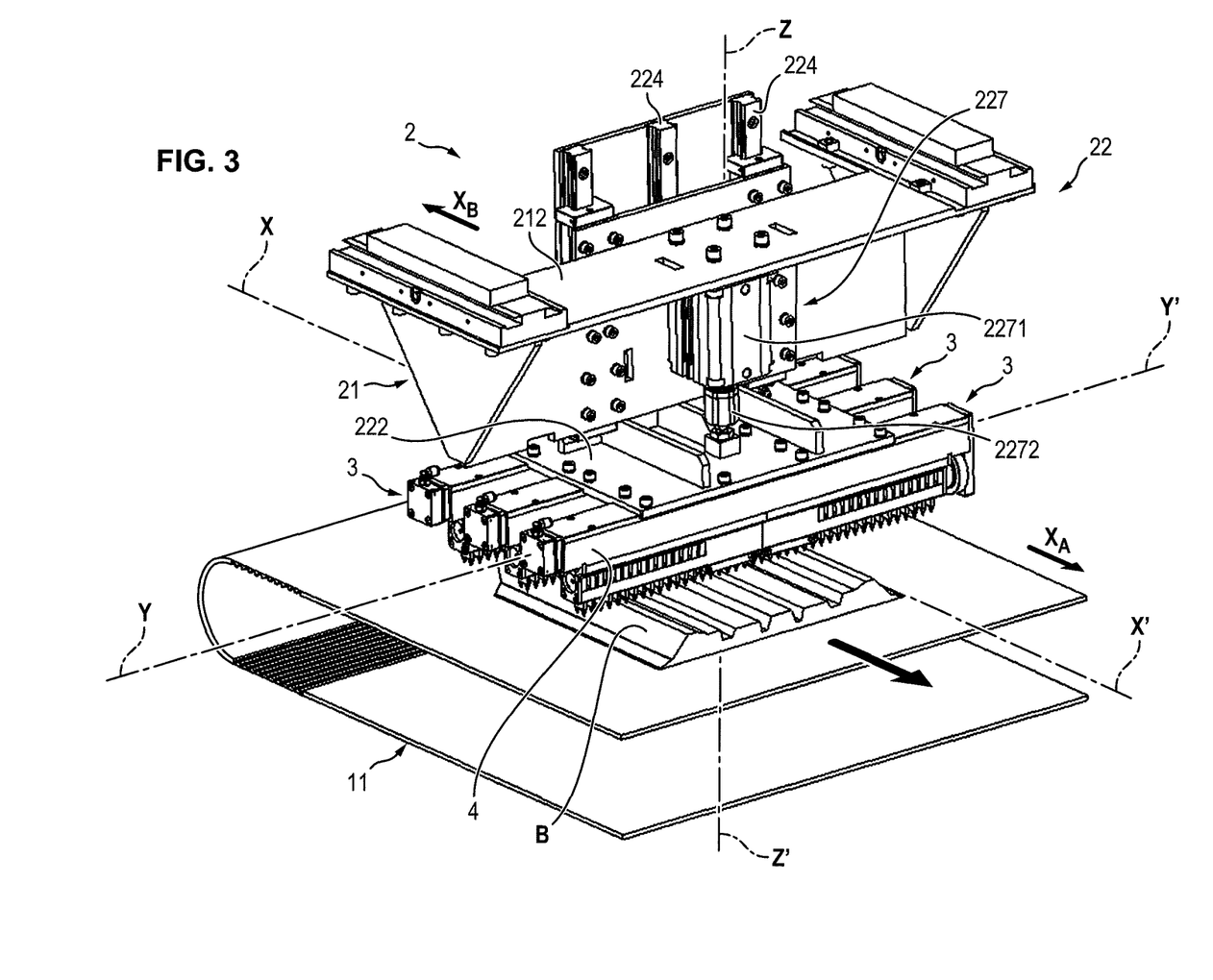
FIG. 3 is a perspective view of the same device, from a different angle.

Referring to FIGS. 2 and 3, it is apparent that the device 2 according to the disclosure comprises means 21 for moving at least one pricking module 3 horizontally and means 22 for moving it vertically. Preferably, and as shown in the figures, there are three of these pricking modules 3. The are preferably disposed parallel to one another, perpendicularly to the direction of axis X-X' and one after another.

Preferably, the means 21 for moving horizontally comprise a carriage 210 comprising a vertical sheet 211 and a horizontal sheet 212 that are joined together perpendicularly, and two brackets 213, which are each fastened to one of the two ends of these sheets, perpendicularly to the two sheets

211, 212. Each bracket 213 supports, in its upper part, a slider 214 that is disposed horizontally and oriented parallel to the direction X-X'.

Each slider 214 is designed to be able to cooperate with a shoe 100, shown only in part in FIGS. 2 and 3. The part 100 is part of the element 10 for guiding in linear translation and covers for example the lower face of the rail of this element 10.

The carriage 210 can thus move in the direction of movement X-X', either in a first direction $X_A$, known as the forward direction of movement AV, that is to say towards the laying form 12 in FIG. 1, or in the opposite direction $X_B$, that is to say towards the rear AR, in the direction of the product reel BP in FIG. 1. This makes it possible to move the pricking modules 3 along the belt 11.

The movement of this carriage 210 is actuated automatically, for example by virtue of a toothed-belt system actuated by a motor.

Preferably, the means 22 for moving vertically comprise a carriage 220 formed by a vertical sheet 221, perpendicular to the axis X-X', which is fixed at its bottom to the upper face of a horizontal sheet 222, substantially at the center thereof.

The pricking modules 3 are fastened to the lower face of this horizontal sheet 222.

Advantageously, at least one bracket 223, in this case two, are fastened to the upper face of the horizontal sheet 222 and to the rear face of the vertical plate 221. These brackets 223 act as stiffeners.

At least two guide rails 224, preferably three, are fastened to the front face of the vertical plate 221, that is to say the face towards the front AV of the installation. These guide rails 224 are vertical and mutually parallel.

The rear face of the vertical plate 211 of the carriage 210 supports two guide shoes 225 and a locking member 226.

Each shoe 225 is an elongate element, which is fastened vertically to the plate 211 and provided with a vertical groove 2250. The groove 2250 is shaped so as to be able to receive the guide rail 224 located opposite it, such that this rail 224 can slide. The two shoes 225 are disposed opposite the first and the third rail 224.

The locking member 226 is disposed between the two shoes 225 and is able to cooperate with the central guide rail 224.

This locking member 226 comprises for example three superposed locking/braking modules 2260, which are able to prevent the sliding of the second rail 224.

The shoes 225 are also provided with at least one locking/braking module 2251 that is able to prevent the sliding of the lateral guide rails 224.

The means 22 for vertically moving also comprise a double-acting hydraulic or pneumatic cylinder 227, which is visible in FIG. 3.

This cylinder comprises a body 2271 and a rod 2272. The body 2271 is secured to the means 21 for moving horizontally, and is fastened for example by its upper part to the horizontal sheet 212. The rod 2272 is fastened to the means 22 for moving, for example to the upper face of the horizontal sheet 222. A reverse setup is likewise possible.

The actuation of this cylinder 227 makes it possible to move the carriage 220 vertically, with respect to the carriage 210, in a direction Z-Z", perpendicular to X-X', specifically in two opposite directions, namely upwards (direction ZA) and downwards (direction ZB).

As will be explained in more detail below, this vertical movement makes it possible to prick the tread B, or, conversely, to separate the modules 3 therefrom.

The device 2 and the means 21 for moving horizontally and means 22 for moving vertically are controlled by a central control unit 13, shown only in FIG. 1, which is for example a computer or a programmable controller.

An exemplary embodiment of a pricking module 3 will now be described in conjunction with FIGS. 4 to 10.

The pricking module 3 comprises a frame 4 which supports a fixed pricking assembly 5 and two "movable" pricking assemblies 6 that are disposed on either side of the fixed pricking assembly 5.

Figure 7:
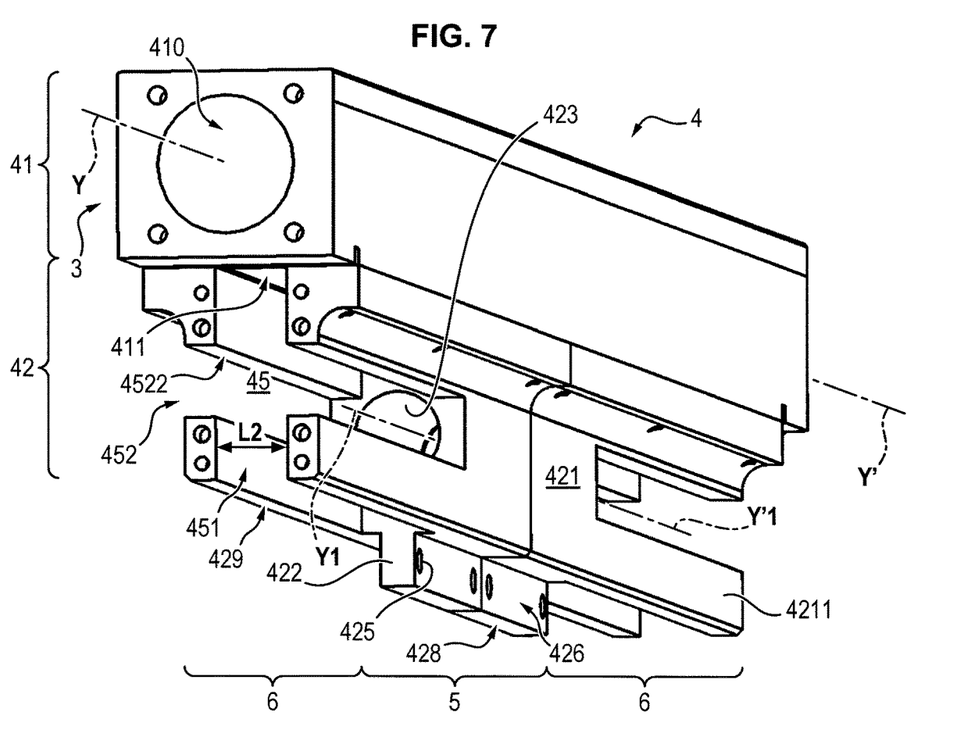
FIG. 7 is a perspective view of the frame of one of the pricking modules of the device in FIG. 3, FIGS. 8 and 9 are views in cross section of the pricking module along the section planes schematically indicated by the lines VIII-VIII and IX-IX, respectively, shown in FIGS. 5 and 10, FIGS. 10 to 13 are views in longitudinal section of a pricking module of the device according to the disclosure, showing the different operating steps of this module.

It is apparent from FIG. 7 that the frame 4 comprises an upper part 41 and a lower part 42. This frame 4 has an elongate shape and a longitudinal axis Y-Y' perpendicular to the direction X-X'.

The upper part 41 has the overall shape of a rectangular parallelepiped, which is pierced right through by a longitudinal bore 410, preferably of cylindrical shape, of longitudinal axis Y-Y'. This bore 410 delimits a housing for receiving an inflatable sleeve 7.

The lower wall of this upper part 41 is solid in its central part situated opposite the fixed pricking assembly 5 and has two longitudinal slots 411 on either side of this central part.

Figure 9:
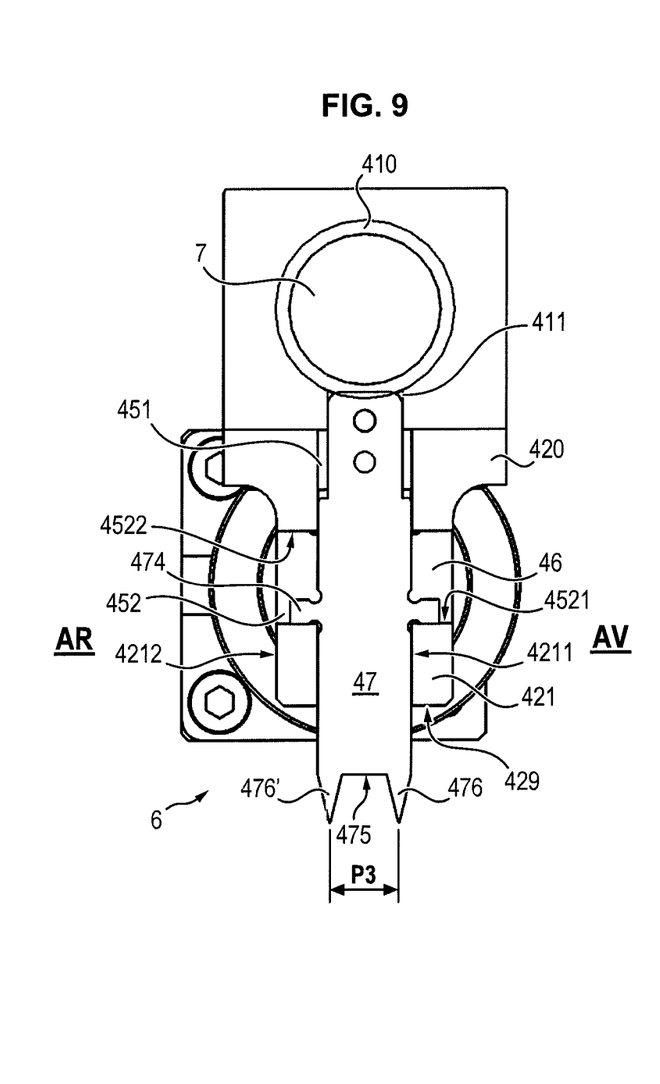

As is more clearly apparent from FIG. 9, each slot 411 leads in its upper part into the lower part of the housing 410 with which it is in communication. The two slots 411 are situated respectively opposite the two movable pricking assemblies 6.

Figure 10:
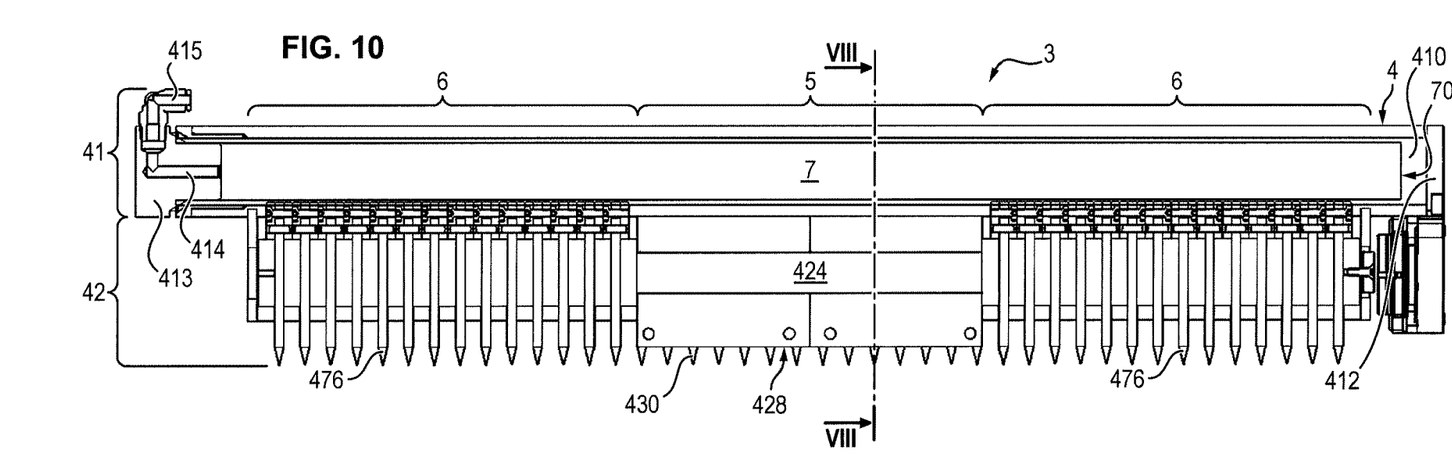

The housing 410 is closed off at one of its ends, in this case the end situated on the right in FIG. 10, by a vertical wall 412 which continues downwards next to the lower part 42.

The inflatable sleeve 7 is closed off at its end 70 situated opposite the wall 412. It is open at its opposite end.

A stopper 413 is inserted in the mouth of the housing 410 situated at the opposite end from the one closed off by the wall 412. This stopper 413 pinches the open end of the inflatable sleeve 7, specifically in a sealed manner.

The stopper 413 is provided with a drilling 414, for example in the shape of an L, which is continued on the outside by a connector 415, in this case for example a bent connector. The connector 415 is configured to be able to be connected to an air supply for the sleeve 7, this not being shown in the figures. The sleeve 7 can thus be supplied with air and inflated.

Figure 8:
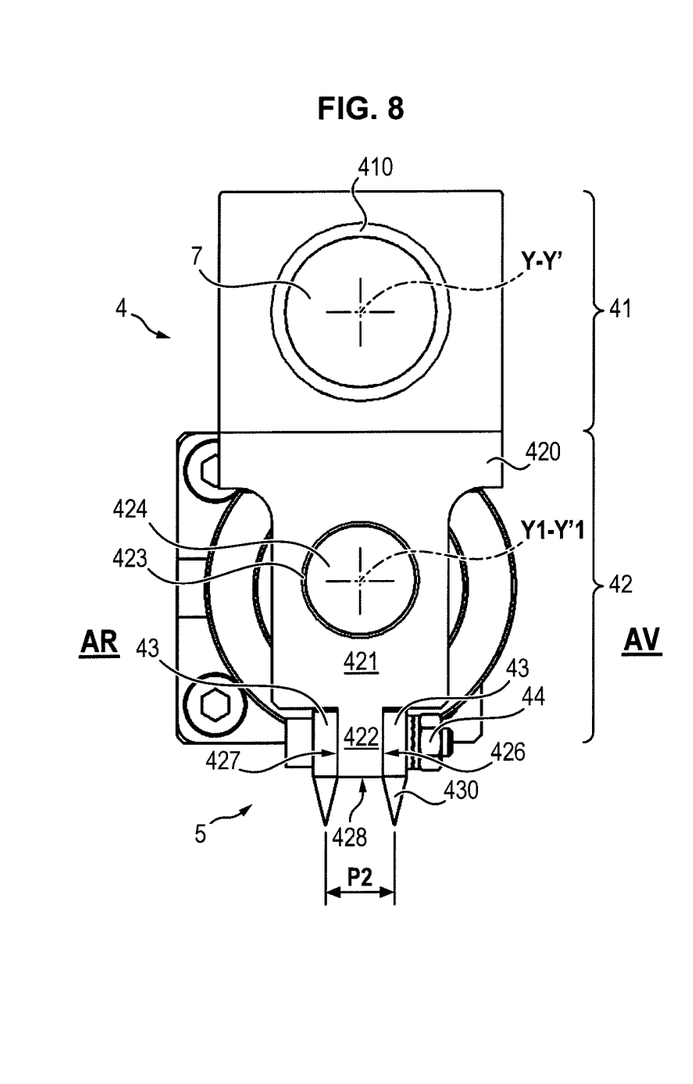

As is more clearly apparent from the view in cross section in FIG. 8, the lower part 42 has, in its central part situated opposite the fixed pricking assembly 5, successively from top to bottom, a wider upper zone 420, a middle zone 421 that is slightly less wide, and a lower zone 422 that is even less wide than the preceding zone. These different zones 420, 421, 422 are each substantially in the form of a rectangular parallelepiped.

The middle zone 421 is pierced right through by a cylindrical bore 423, which extends along a longitudinal axis Y1-Y'1 parallel to the axis Y-Y' and perpendicular to the direction X-X'. This bore 423 allows the reception of a cylindrical thrust shaft 424.

As is visible in FIGS. 7 and 8, the lower zone 422 is pierced right through by several holes 425 that are perpendicular to the axis Y1-Y'1 and parallel to the direction X-X'. These holes 425 lead out onto the opposing front face 426 and rear face 427 of the central zone 422. The lower face 428 of the lower zone 422 forms a flat horizontal contact surface.

Figure 6:
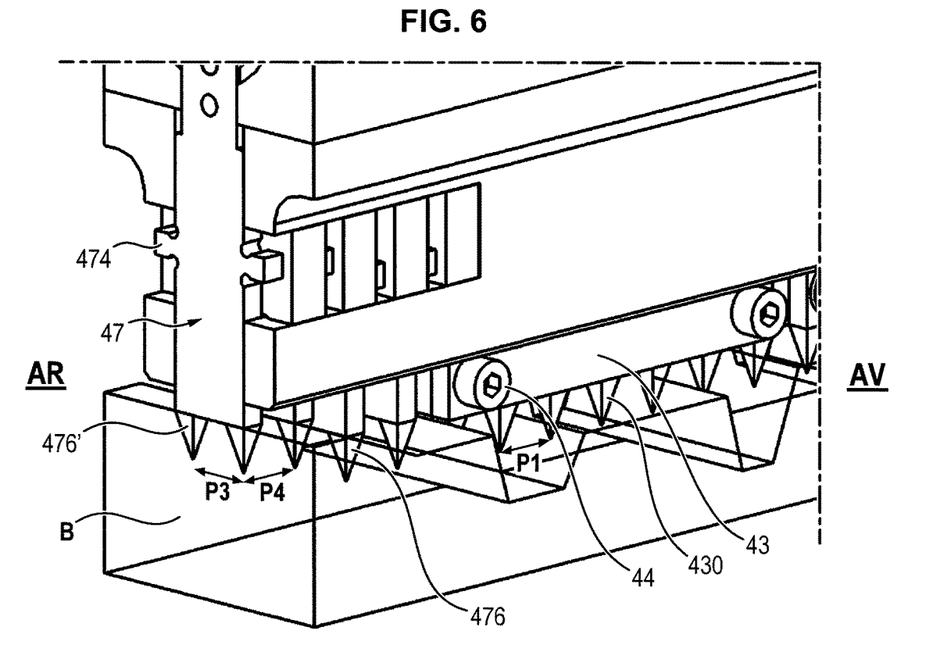
FIG. 6 is a detail view of a part of the device in FIG. 3, showing a fixed pricking assembly and a part of a movable pricking assembly.

As is more clearly apparent from FIGS. 6 and 8, a flat bar 43 is fastened to each face 426 and 427, respectively, with the aid of a bolt-nut assembly 44. Each bar 43 is continued in its lower part by a set of spikes 430. The different spikes 430 of one and the same bar 43 are spaced apart from one another by a spacing known as "first spacing" P1 (measured from tip to tip).

Moreover, each spike 430 of the first bar 43 is spaced apart from the spike 430 of the second bar 43, situated on the opposite side in the direction X-X', by a spacing known as "second spacing" P2.

Preferably, the spacings P1 and P2 are the same.

The bars 43 and thus the spikes 430 are secured to the frame 4. This central part of the frame 4 is said to form a fixed pricking assembly 5, in that said spikes 430 are fixed with respect to the frame 4 of the module 3. These spikes 430 follow the vertical or horizontal movement of the module 3, however.

It would also be possible to have more than two rows of spikes 430.

The two lateral zones of the lower part 42 of the frame 4 that are situated next to the movable pricking assemblies 6 will now be described in conjunction with FIGS. 6, 7 and 9. They are identical, and only one will be described in detail.

Here, the lower part 42 comprises only the wider upper zone 420 and the less wide middle zone 421.

The lower part 42 has, in cross section, that is to say in a plane perpendicular to the axis Y1-Y'1, a cross-shaped housing 45.

The vertical leg 451 of this cross-shaped housing 45 extends from the slot 411 to the lower face 429 of the middle zone 421.

The horizontal leg 452 of the cross-shaped housing 45 extends from the front face 4211 of the middle zone 421 to the rear face 4212 thereof.

The leg 452 leads out opposite the bore 423.

Figure 5:
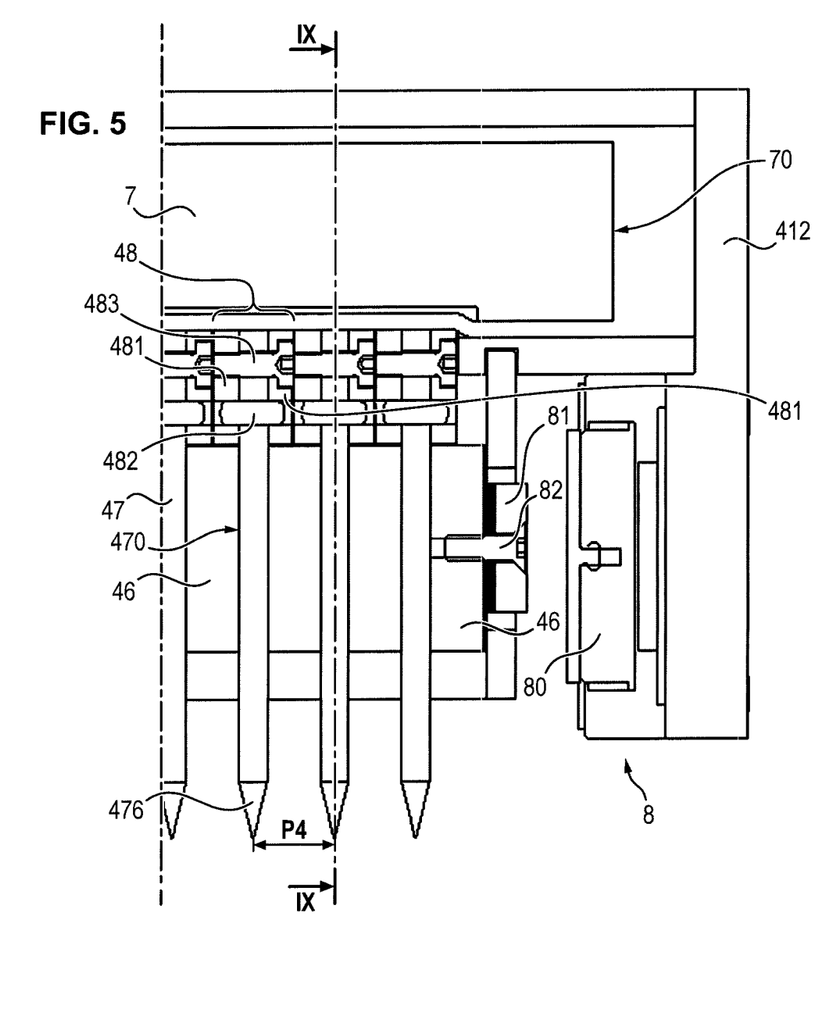
FIG. 5 is a cross-sectional detail view of one end of a pricking module.

As can be seen in FIGS. 5, 6 and 9, rectangular fittings 46 have been inserted into the horizontal leg 452 of the cross-shaped housing 45. These fittings 46, which are in the form of rectangular parallelepipeds, are spaced apart from one another. They are disposed in planes perpendicular to the axis Y1-Y'1.

A pricking plate 47 is interposed between two adjacent fittings 46.

Figure 4:
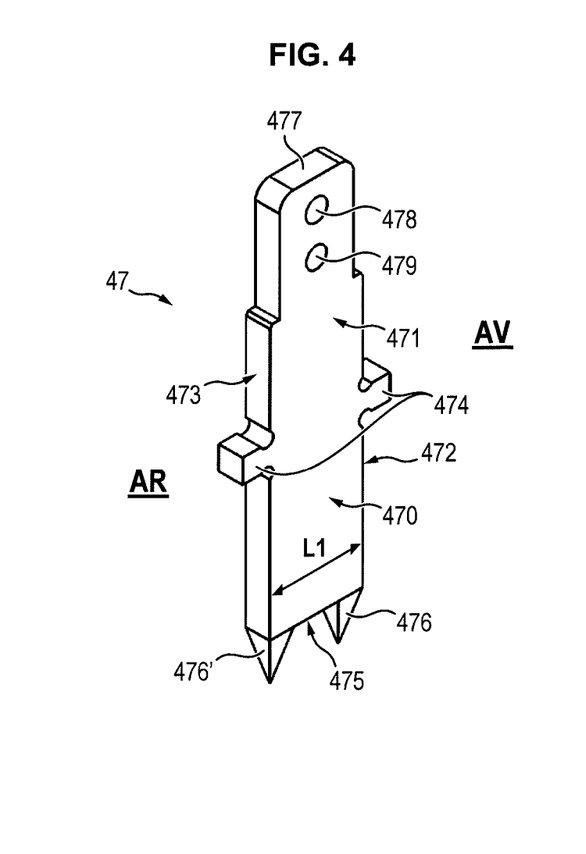
FIG. 4 is a perspective and assembled view of a pricking plate.

An exemplary embodiment of the pricking plate 47 will now be described in more detail in conjunction with FIG. 4.

The pricking plate 47 has a cross-shaped overall shape.

It is formed of a flat sheet 470 that is longer than it is wide and has a small thickness, having substantially the shape of a rectangular parallelepiped. This sheet 470 has two opposite lateral faces 471, a front face 472, a rear face 473, thus named since they are oriented towards the front AV and the rear AR, respectively, of the device 2 of the installation 1. Two arms 474 project from each of the front face 472 and rear face 473, substantially halfway up the latter.

The sheet 470 also has a flat lower face 475 which is continued by a front spike 476 and a rear spike 476', which are spaced apart from one another at their tips by a spacing known as "third spacing" P3, which is preferably the same as the second spacing P2 (see FIGS. 6 and 9).

The face 475 forms a flat horizontal contact surface, as will be described below.

The sheet 470 also has an upper face 477, on the opposite side from the face 475. In its upper part, it has two holes, namely an upper hole 478 and a lower hole 479, passing right through the sheet 470 so as each to lead out onto the lateral faces 471 thereof.

The width L1 of the sheet 470 of the plate 47 corresponds, allowing for sliding play, to the width L2 of the vertical leg 451 (see FIG. 7).

The plate 47 can thus slide vertically inside the leg 451, which forms a vertical guiding space.

The two arms 474 can move in the horizontal leg 452 of the cutout 45.

The two legs 474 constitute stops for limiting the vertical travel of the plate 47. The latter can move vertically between a bottom position, shown in FIG. 9, in which the legs 474 butt against the lower face 4521 of the leg 452 formed in the zone 421, and a top position, in which the two legs 474 butt against the upper face 4522 of the leg 452.

In order to enlarge the contact surface between the plate 47 and the inflatable sleeve 7, the pricking plate 47 is advantageously provided with a contact head 48.

As can be seen from the detail view in FIG. 5, this head 48 comprises two rectangular plates 481, fastened respectively on either side of the upper part of the sheet 470, specifically by means of a pin 482 passing through the hole 479 and a screw 483 passing through the hole 478.

Preferably, the shape of the spikes 476, 476' of a plate 47 is identical to the shape of the spikes 430. Preferably, this shape is pyramidal. Other shapes could be envisaged, however, as long as they make it possible to easily penetrate the rubber tread B.

As can be seen in FIG. 6, each pricking plate 47 is spaced apart from an adjacent plate 47, such that its forwardly oriented spike is spaced apart from the adjacent forwardly oriented spike, by a spacing known as "fourth spacing" P4, which is preferably the same as the first spacing P1.

Finally, as can be seen more clearly in FIG. 5, the frame 4 is provided with a holding cylinder 8. This holding cylinder 8 is carried by the end wall 412. It can move axially towards the left of the figure along the axis Y1-Y'1.

Moreover, a thrust plate 81 is screwed, with the aid of a screw 82, to the last fitting 46, which faces the cylinder 8.

Figure 13:
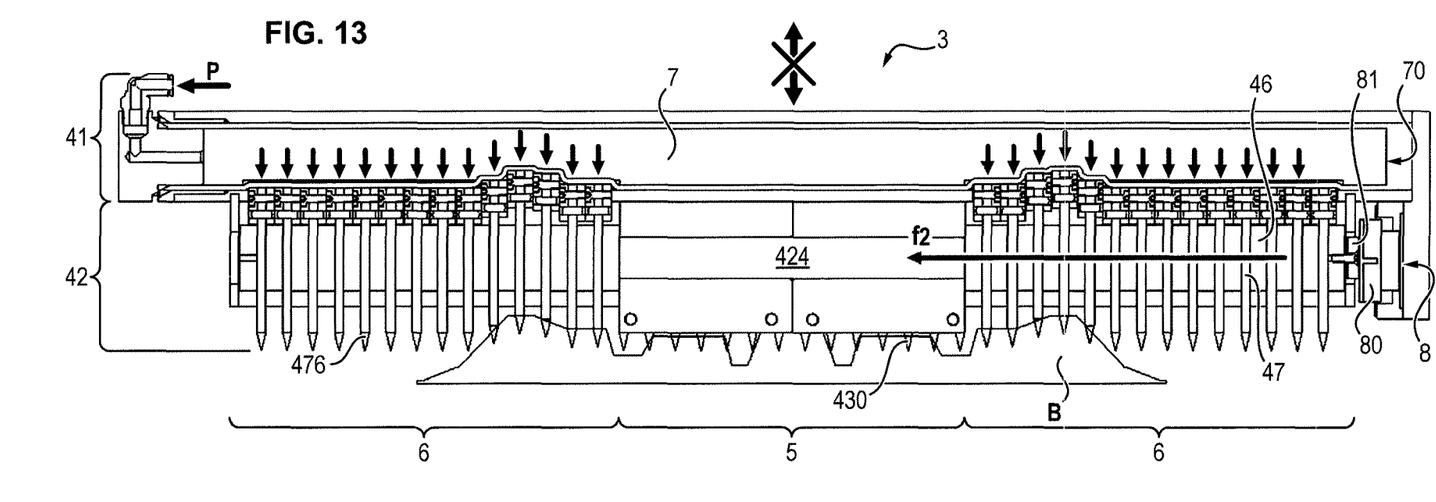

As can be seen in FIG. 13, the head of the rod 80 of this cylinder 8 can be moved axially so as to be pressed against the thrust plate 81, and in so doing, clamp the different fittings 46 and the pricking plates 47 interposed therebetween together, from the right to the left in FIGS. 5 and 13. The last fitting 46 of the movable pricking assembly 6, which is situated on the right in FIG. 13, presses against the thrust shaft 424, which in turn transmits this clamping force to the fittings 46 and plates 47 of the movable pricking assembly 6 situated in the left-hand part of FIG. 13.

The operation of the automated device 2 for gripping and handling a tread B according to the disclosure will now be described in more detail with reference in particular to FIGS. 10 to 13.

First of all, a series of steps consisting of a "profiling" cycle is carried out. This cycle has the purpose of regulating the automated gripping device 2 so as to acquire the profile of the tread B to be moved.

Initially, the tread B is present on the belt 11 for linearly moving, as shown in FIG. 1. The device 2 is positioned above the rear end of the tread, at a distance therefrom. At this stage, the inflatable sleeve 7 is not supplied with air, the thrust cylinder 8 is not supplied either, and the pricking plates 47, under the action of their own weight, are in the bottom position inside the vertical guiding space 45. This corresponds to the situation shown in FIG. 10.

Figure 11:
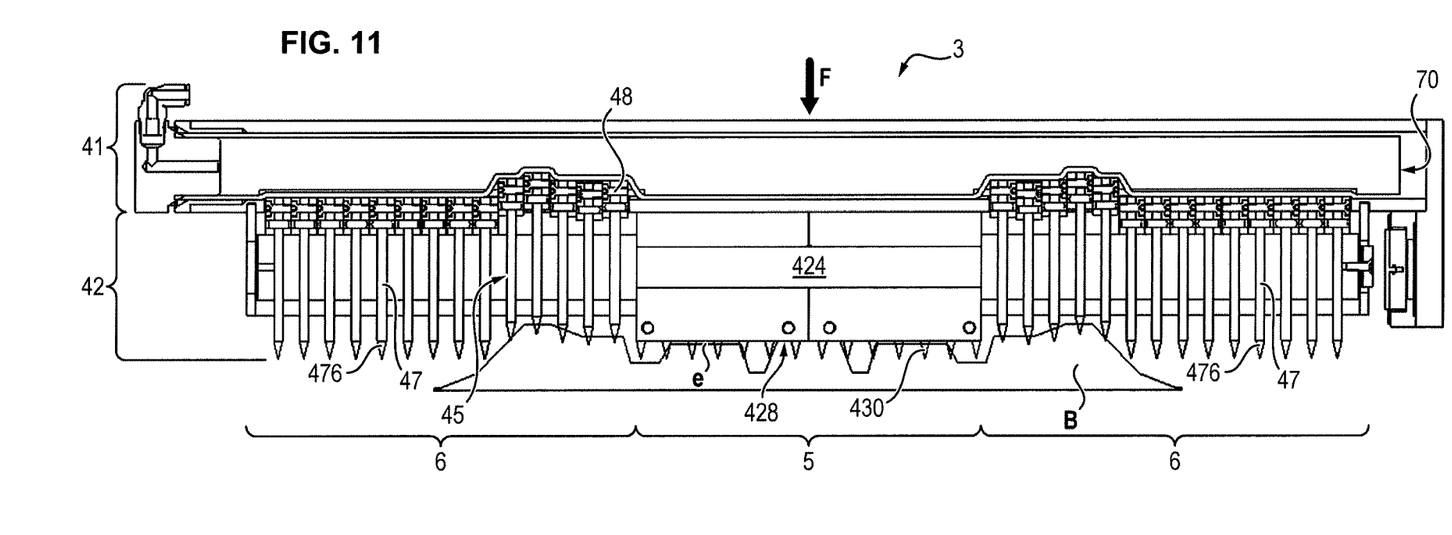

Next, as shown in FIG. 11, the cylinder 227 of the means 22 for moving vertically is actuated, so as to press the pricking modules 3 against the tread B with a force F.

The lowering continues until the stop surface 428 comes into contact with the uppermost point of the profile of the tread B situated opposite. The "fixed" spikes 430 pass into the tread B with which they are engaged. The inflatable sleeve 7 is still not supplied with air and the thrust cylinder 8 is not actuated.

As can be seen in the left-hand and right-hand parts of FIG. 11, the pricking plates 47 come into contact with the profile of the tread B and move up freely inside the vertical guiding space 45, in an uncontrolled manner. The pricking realized by these pricking plates 47 is thus not realized. The upper ends 48 of the plate 47 come into contact with the inflatable sleeve 7 and deform the latter.

As can be seen in FIG. 6, some of the fixed spikes 430 can be located opposite a void in the tread B and therefore cannot be engaged therewith.

As can be seen in FIG. 11, the dimension "e", representing the pricking default, should be greater than 0 mm and less than or equal to 2 mm in order to obtain efficient pricking of the tread B.

The force F is made up of a force f applied by the cylinder 227 and by the overall weight of the automated gripping and handling device 2. This force f applied by the cylinder 227 can be adjusted depending on the cycle and/or on the product, for example on the nature of the rubber of the tread B.

During this "profiling" cycle, the force F necessary is equal to the pricking force of the fixed spikes 430 of all the bars 43 of all the fixed pricking assemblies 5.

During a "laying cycle", which will be described below, the force F necessary is equal to the pricking force of all the fixed spikes 430 plus the pricking force of the movable plates 47 engaged with the tread B, for all the modules 3.

Figure 12:
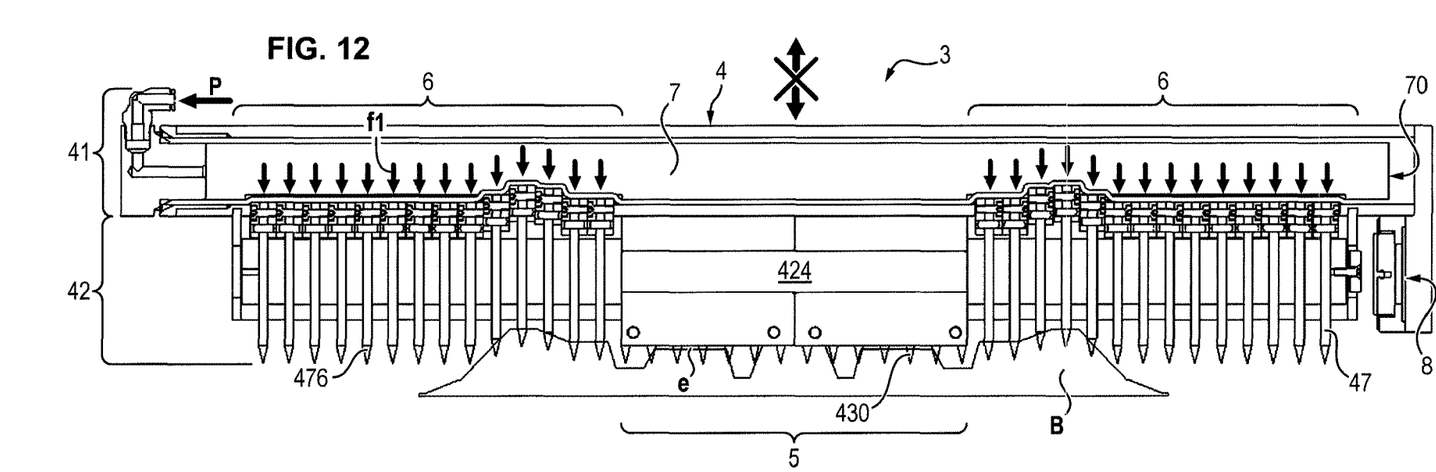

During a third step, shown in FIG. 12, the height of the device 2 and more specifically of the pricking modules 3 is locked mechanically with the aid of the member 226 (FIG. 2) and the locking/braking modules 2251. The inflatable sleeve 7 is supplied with compressed air at a pressure P. By virtue of this, a force $f_1$ (see FIG. 12) is transmitted to each pricking plate 47 by the inflatable sleeve 7. The thrust cylinder 8 still has not been actuated.

Under the action of the pressure exerted by the inflatable sleeve 7, the pricking plates 47 move down into contact with the tread B until their contact surfaces 475 bear against the outer surface of the tread B against which they are pressed. This situation is the one shown for example in FIG. 6, for the plate 47 situated furthest to the left. The engagement of the tread B is thus efficient.

The movable plates 47 that face a void in the profiled element B remain in abutment under the action of their own weight, the arms 474 resting against the faces 4521, as shown in FIG. 9.

Note that the force F exerted by the cylinder 227 should comply with the following formula:

$$F > n \times f_1(\max) \times a$$

where F=mechanical locking (N)
n=the number of movable plates 47 per pricking module 3,
$f_1$ max corresponding to the maximum force per pricking plate (expressed in N) at the maximum pressure admissible by the inflatable sleeve 7 (expressed in N)
where a=the number of pricking modules 3, for example in this case three.

Finally, during a fourth step shown in FIG. 13, the thrust cylinder 8 is actuated so as to exert a clamping force f2, which is transmitted to all of the pricking plates 47 and to the fittings 46, thereby locking them in terms of height, inside the vertical guiding space 45.

In this position, the height of the pricking modules 3 is still mechanically locked by the cylinder 227. Similarly, the inflating membrane 7 remains supplied with compressed air at the pressure P.

The thrust shaft 424 then transmits the force f2 exerted by the cylinder 8 to the left-hand part of the system (in FIG. 13) with:

$$f2 > \frac{f1(\max)}{\mu(\text{steel}) \times 2}$$

where f1 (max)=maximum force exerted by the pricking plate (expressed in N) at the maximum pressure admissible by the inflating sleeve 7.

μ (steel)=friction factor between two steel parts,
2 corresponds to the two contact surfaces of a pricking plate 47.

During the "laying cycle" described below f2 complies with the formula:

$$f2 > \frac{T(\max)}{\mu(\text{steel}) \times 2}$$

where Tmax=maximum traction or compression force per plate engaged with the tread B (expressed in N). Finally, while the cylinder 227 is still actuated to maintain the height position of the pricking modules 3 and the thrust cylinder 8 is still active, the inflating sleeve 7 is no longer supplied with compressed air.

A negative image of the upper profile of the tread B is thus obtained, through the arrangement of the different fixed and movable spikes.

The engagement of the tread B is thus effective and the means 21 for moving the pricking modules 3 horizontally are thus actuated so as to drive the device 2 forwards (see FIG. 1) until the tread B has been deposited around the laying form 12.

The cylinder 227 is then actuated so that the pricking modules 3 are lifted and separate from the tread B, then the means 21 for moving horizontally are actuated to return the device 2 to the rear, in its starting position shown in FIG. 1.

It is then possible to start a "laying cycle", with other treads B having the same profile as the tread that has been used to acquire the negative of the profile of this tread. While the pricking plates 47 are still fixed in their height position, the device 2 is again lowered in order to pick up a new tread B and convey it to the form 12. This step can be repeated as long as the dimension "e" is respected or as long as the profile of the tread B does not change.

On the other hand, in order to handle a tread B having a different profile, the "profiling" cycle will have to be repeated.

The invention claimed is:
1. An automated device for gripping and handling a tread for a tire, wherein this automated device comprises:
   at least one module for pricking said tread,
   a means for moving said pricking module vertically,
   a means for moving said pricking module horizontally in a linear direction of horizontal movement X-X',
   said pricking module comprising a frame provided with at least one movable pricking assembly and at least one fixed pricking assembly, the at least one fixed pricking assembly comprising a flat, horizontal abutment surface formed at the base of said frame, at least two spikes projecting downward from said surface, the at least one movable pricking assembly comprising:
at least one movable pricking plate provided at its base with at least one flat horizontal contact surface from which at least two spikes project, this pricking plate being disposed inside a vertical guiding space formed in said frame, such that the spikes thereof project downward, and this at least one movable pricking plate being freely movable vertically in this space over a limited travel,
a device for moving said pricking plate vertically from a top position to a bottom position inside said vertical guiding space, which comprises an inflatable sleeve, said pricking plate being disposed inside the vertical guiding space such that the upper end of said pricking plate rests against the inflatable sleeve when the pricking plate is in the bottom position and such that the upper end of said pricking plate deforms said inflatable sleeve when the pricking plate is at a height greater than said bottom position,
said inflatable sleeve tending to push the pricking plate back downward when the inflatable sleeve is inflated, and
a device for locking the height position of said plate inside said vertical guiding space.

2. The automated device according to claim 1, wherein said pricking module comprises, on one and the same frame, a fixed pricking assembly at the center and two movable pricking assemblies disposed on either side.

3. The automated device according to claim 1, wherein each pricking plate comprises two spikes known as the "front" spike and the "rear" spike, which are separated from one another by said contact surface, the tips of these two spikes being spaced apart by a spacing known as "third spacing".

4. The automated device according to claim 3, wherein the at least one movable pricking assembly comprises at least two movable pricking plates, which are disposed in parallel and in such a way that the axis connecting the tips of the front spike and rear spike of each plate is parallel to said direction of horizontal movement X-X' of said pricking module and in such a way that the tips of the front spikes of the different plates are aligned along an axis perpendicular to said direction of movement X-X' of the module and that the tip of the front spike of a plate is spaced apart from the tip of the front spike of the neighbouring plate by a spacing known as "fourth spacing".

5. The automated device according to claim 1, wherein the at least one movable pricking plate comprises at least one stop for limiting its travel in its two directions of vertical movement.

6. The automated device according to claim 1, wherein said device for moving said plate vertically from the top position to the bottom position comprises:
a bore for receiving said inflatable sleeve, formed in an upper part of said frame, this bore having, at its bottom, a horizontal slot that extends perpendicularly to said direction of horizontal movement X-X' of the pricking module, this slot leading out above said vertical guiding space, and the latter being formed in a lower part of said frame,
a device for inflating said inflatable sleeve, configured to be able to be connected to a compressed air supply.

7. The automated device according to claim 1, wherein said frame comprises, in its lower part, a housing, which has a cross shape in cross section in a plane parallel to said direction of horizontal movement X-X' of the pricking module, i.e. is provided with a horizontal leg and with a vertical leg, the latter leading onto the lower surface of the frame, wherein said pricking plate is likewise cross-shaped, such that it comprises a plate provided with two arms, in that said pricking plate is disposed in said housing such that the plate can slide in the vertical leg and each of its arms can slide in one of the horizontal legs, the two arms forming stops for limiting the travel of said plate, and wherein fittings are disposed in the horizontal leg in a manner parallel to one another and in a plane parallel to that of said direction of horizontal movement (X-X') of the pricking module, each pricking plate being interposed between two of these fittings, the housing delimiting, with two adjacent fittings, said vertical guiding space of the pricking plate.

8. The automated device according to claim 7, wherein the top of said vertical leg of the cross-shaped housing leads into a slot of a receiving bore of the inflatable sleeve.

9. The automated device according to claim 7, wherein said device for locking the height position of said plate comprises a thrust cylinder that applies axial thrust in a horizontal direction perpendicular to said horizontal direction of movement X-X' of the pricking module, so as to clamp said fittings and said at least one movable plate together and to prevent the vertical movement of said pricking plate, when the thrust cylinder is activated.

10. The automated device according to claim 1, wherein the device comprises three pricking modules that are disposed parallel to one another such that their respective longitudinal axes are perpendicular to the direction of horizontal movement X-X' of the pricking module.

11. An installation for moving a tread for a tire, wherein the installation comprises:
an element for guiding in linear translation,
an automated device for gripping and handling a tread for a tire according to claim 1, the horizontal movement means of which make it possible to move said pricking module along said element for guiding in linear translation,
a belt for linearly moving said tread, said belt being disposed under said automated gripping and handling device, this belt allowing the tread to be moved in a horizontal direction parallel to said direction of horizontal movement X-X' of said pricking module.

12. The installation according to claim 11, wherein this installation also comprises a laying form that is able to receive said tread at the end of said moving belt.

* * * * *